United States Patent [19]
Gardner et al.

[11] Patent Number: 5,729,557
[45] Date of Patent: Mar. 17, 1998

[54] CELLULAR COMMUNICATION SYSTEM WITH MULTIPLE CODE RATES

[75] Inventors: Steven H. Gardner, San Diego; James E. Petranovich; C. Thomas Hardin, both of Encinitas, all of Calif.

[73] Assignee: Pacific Communication Systems, Inc., San Diego, Calif.

[21] Appl. No.: 542,541

[22] Filed: Oct. 12, 1995

[51] Int. Cl.$^6$ .......................... H03M 13/00; H03M 13/12
[52] U.S. Cl. .................................................. 371/41
[58] Field of Search ...................... 371/5.5, 35, 41; 455/53.1, 54.1, 56.1, 63, 67.1, 67.3, 68, 69

[56] References Cited

U.S. PATENT DOCUMENTS

| | | | |
|---|---|---|---|
| 4,701,923 | 10/1987 | Fukusawa et al. | 371/41 |
| 5,230,003 | 7/1993 | Dent et al. | 371/43 |
| 5,396,516 | 3/1995 | Padovani et al. | 375/225 |
| 5,546,411 | 8/1996 | Leitch et al. | 371/5.5 |

OTHER PUBLICATIONS

Sato et al., "Error-Free High-Speed Data Transmission Protocol Simultaneously Applicable to Both Wire and Mobile Radio Channels", 1988 Vehicular Technology Conf., pp. 489–496, Dec. 1988.

Sampath et al., "Power Control and Resource Management for a Multimedia CDMA Wireless System", 6th Symp. on Personal, Indoor and Mobile Radio Communications, pp. 21–25, Jan. 1995.

Abeta et al., "Adaptive Coding Rate and Processing Gain Control for Cellular DS/CDMA Systems", 4th Int'l. Conf. on Universal Personal Communications, pp. 241–245, Apr. 1995.

Aridhi et al., "Performance Analysis of Type–I and Type–II Hybrid ARQ Protocols Using Concatenated Codes in a DS_CDMA Rayleigh Fading Channel", 4th Int'l. Conf. on Universal Personal Communications, pp. 748–752, Apr. 1995.

Gardner, Steven H., et al., "A New FDMA Modem for Defense Satellite Communications", 1986 IEEE Military Communications Conference, Oct. 5–9, 1986.

*Primary Examiner*—Stephen M. Baker
*Attorney, Agent, or Firm*—John Land; J. P. Violette

[57] ABSTRACT

A method and apparatus for using multiple code rates for forward error correction in a cellular digital data radio communication system. Each base station broadcasts a quantity called the power product (PP), which is equal to the base station transmit power, $P_{BT}$, multiplied by the power level received at the base station, $P_{BR}$. For a mobile unit to determine its appropriate transmit power, $P_{MT}$, requires measuring the power received, $P_{MR}$, at the mobile unit and performing the following calculation: $P_{MT}=PP/P_{MR}$. When channel path loss is large, it is possible that the power control calculation will return a value greater than the maximum transmit power capability of the mobile unit. In such a case, the mobile unit selects a lower code rate. Base station receiver sensitivity improves as the code rate decreases, so the result is similar to increasing the transmitter power. In the preferred embodiment, the invention uses 3 different code rates. In most cases, the code rate used is rate 2/3, but when a mobile unit determines that it needs more transmit power than it is capable of providing, the code rate is changed to 1/2, and in severe cases the code rate is changed to 1/3. Other features are that mobile unit code rate selection can be based on the quantity of data to be transmitted, and a base station can determine the code rate used by a mobile unit by attempting to decode all code rates and choosing the best result.

16 Claims, 5 Drawing Sheets

CELLULAR COMMUNICATION SYSTEM WITH MULTIPLE CODE RATES

BACKGROUND OF THE INVENTION

1. Field of the Invention

This invention relates to cellular radio communication systems, and more particularly to a method and apparatus for using multiple code rates for forward error correction in a cellular digital data radio communication system.

2. Description of Related Art

Forward error correction (FEC) coding techniques are frequently used for providing improved error rate performance in communication channels. FEC coding can enable a receiving station to reconstruct a corrupted version of the signal sent by a transmitting station. Errors in an original signal may be due, for example, to noise masking a low power signal, or interference, or shadowing of the signal by terrain features, or Rayleigh (multipath) interference.

FEC coding techniques have been in use since the 1960s and are described in many texts (e.g., "Error Correcting Coding for Digital Communications", George C. Clark & J. Bibb Cain, Plenum Press, 1981). A common feature of FEC coding techniques is that the process of encoding increases the number of bits required to be transmitted. The ratio of the number of bits entering the encoder to the number of bits to be sent over the channel is commonly called the "code rate". The lower the code rate, the greater the number of bits (comprising data bits and error-correction code bits) that must be transmitted.

Increasing the number of bits to be transmitted requires that either more bandwidth be available for transmission or that the rate at which the user's information is sent on the channel (the "data rate") be reduced to the point that the signal containing the coded data has the same bandwidth that would have been occupied by the uncoded signal.

In general, with all other things being equal, using an FEC code with a lower code rate provides better error correction performance. Thus, in a very poor channel it may be desirable to use a very low code rate to achieve an acceptable error rate performance. In a better channel, the error correcting performance of a very low code rate may be unnecessary. In such cases, a higher code rate could provide adequate error rate performance with a lower transmitted code bit rate, and thus higher data rate. Thus, in such situations, it may be more desirable to use a higher code rate, especially in systems where available bandwidth is fixed.

In many communication systems, such as satellite systems, the signal level at the receiver varies relatively little from site to site and over time. The main concern of the designer of such system is often the power required to be sent over the link, and bandwidth may be a lesser concern. The system designer then may choose a single low code rate, and if properly chosen, this one code rate will provide adequate performance without wasting resources in most conditions.

In land mobile radio communications, however, the signal at the receiver varies over a wide range depending on the distance from the base station to the mobile unit, the presence or absence of terrain features that can shadow the signal, and fading due to the Rayleigh effect. Channels are fixed in bandwidth, so use of FEC coding reduces channel throughput. On the forward link (from the base station to the mobile unit), it is often cost effective merely to increase transmitter power to ensure that the received signal level is adequate and code rates can be kept relatively high. On the reverse link, the mobile unit is frequently extremely limited in transmit power capability due to the need to minimize power consumption for long battery life and also due to potential health hazards from having a high-powered microwave transmitter in proximity with the human body. In many situations, the power level on the forward link is sufficient for the mobile unit to receive well, but the error rate on the reverse link is unacceptable because the power received at the base station is inadequate. Using a lower code rate can often solve this problem, but only at the expense of reducing system throughput.

Accordingly, a need exists for an improved way of using forward error correction in a cellular digital data radio communication system. The present invention provides such an improvement.

SUMMARY OF THE INVENTION

This invention comprises a method and apparatus for using multiple code rates for forward error correction in a cellular digital data radio communication system. Each base station broadcasts a quantity called the power product (PP), which is equal to the base station transmit power, $P_{BT}$ (in Watts), multiplied by the desired receive power level at the base station, $P_{BR}$ (in Watts). For a mobile unit to determine its appropriate transmit power, $P_{MT}$ (in Watts), simply requires measuring the power received, $P_{MR}$ (in Watts), at the mobile unit and performing the following calculation:

$$P_{MT} = PP/P_{MR}$$

When channel conditions such as distance or shadowing are such that the channel path loss is large, it is possible that the power control calculation above will return a value that is greater than the maximum transmit power capability of the mobile unit. In this case, the power received at the base station will be less than desired, and the resulting error performance may be unacceptable. Accordingly, under the inventive system, when a mobile unit determines that the desired transmit power level exceeds its capability, the mobile unit can then select a lower code rate. The base station receiver sensitivity improves as the code rate decreases, so the result is similar to increasing the transmitter power.

In the preferred embodiment, the invention uses 3 different code rates. Each is based on a constraint length 7 convolutional code that is standard in the industry. In most cases, the code rate used is rate 2/3, but when a mobile unit determines that it needs more transmit power than it is capable of providing, the code rate is changed to 1/2, and in severe cases the code rate is changed to 1/3.

Other features of the invention are that mobile unit code rate selection can be based on the quantity of data to be transmitted, and a base station can determine the code rate used by a mobile unit by attempting to decode all code rates and choosing the best result.

Key benefits of this invention are that it (1) allows the most disadvantaged mobile units in a mobile wireless data communication system to achieve acceptable reverse link error performance through the use of very low code rates (2) without introducing the capacity degradation that results from low code rates into all transmissions of non-disadvantaged mobile units, which comprise the majority of transmissions within a cellular radio communication system.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings indicate like elements.

DETAILED DESCRIPTION OF THE INVENTION

Figure 1:
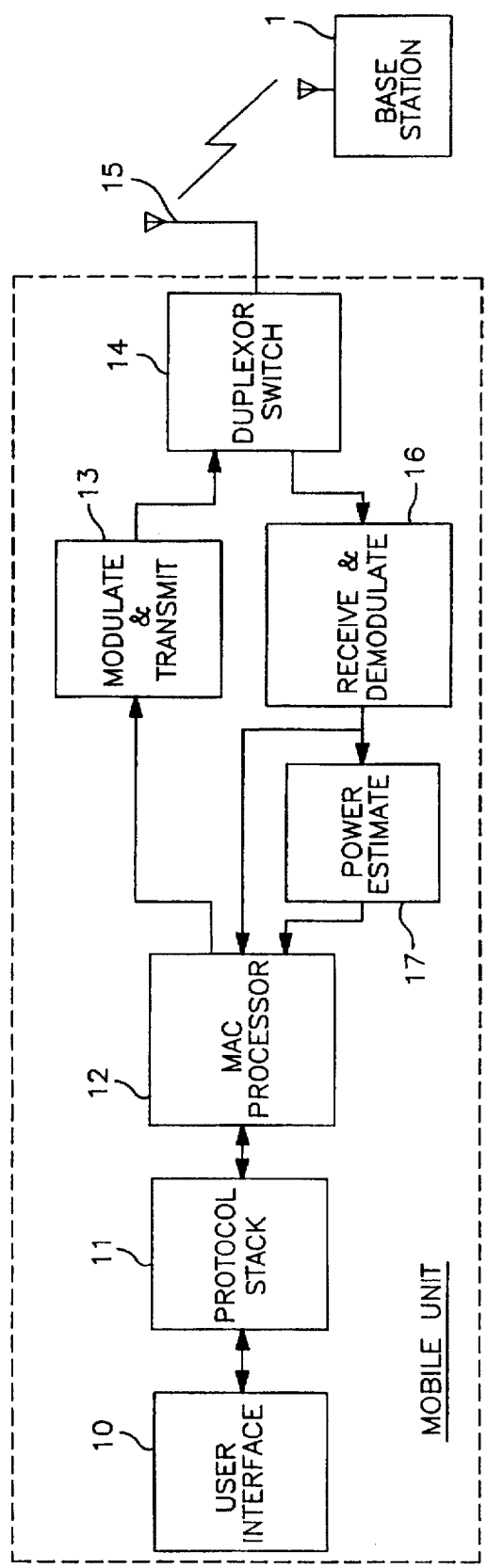
FIG. 1 is a block diagram showing a typical prior art cellular radio communication system.

Throughout this description, the preferred embodiment and examples shown should be considered as exemplars, rather than as limitations on the present invention.

Principles of Operation

The present invention uses a forward error correction technique in which a mobile unit in a cellular digital data radio communication system is capable of transmitting with multiple code rates. Because FEC coding is a way of overcoming insufficient transmit power capability in a mobile unit, selection of a code rate is preferably incorporated into the mobile unit power control algorithm. In the preferred embodiment, the power control algorithm is based on the method used in the Cellular Digital Packet Data (CDPD) standard. This method takes advantage of the fact that forward link and reverse link path loss are very nearly equal on average. The forward link path loss can be determined by dividing the base station transmit power, $P_{BT}$ (in Watts) by the power received at the mobile unit, $P_{MR}$ (in Watts). The reverse link path loss is equal to the mobile unit transmit power, $P_{MT}$ (in Watts), divided by the power level received at the base station, $P_{BR}$ (in Watts). Setting these two path losses equal to each other and manipulating the result yields:

$$P_{MT} = P_{BT} * P_{BR}/P_{MR}$$

Thus, if a mobile unit can determine the base station transmitter power and can estimate the power level the mobile unit itself is receiving, and if the mobile unit can determine what power level the base station needs to receive for acceptable performance, the mobile unit can determine the required mobile transmit power. In the CDPD standard, each base station broadcasts a quantity called the power product (PP), which is equal to $P_{BT}*P_{BR}$. For a mobile unit to determine its appropriate transmit power simply requires measuring the received power at the mobile unit and performing a simple calculation. Accordingly, the inventive system determines if the transmitted error-correction encoded data is satisfactorily received by the base station, and if not, a lower code rate is selected for use by the mobile unit.

When channel conditions such as distance or shadowing are such that the channel path loss is large, it is possible that the power control calculation above will return a value that is greater than the maximum transmit power capability of the mobile unit. In this case, the power received at the base station will be less than desired, and the resulting error performance may be unacceptable. Accordingly, under the inventive system, when a mobile unit determines that the desired transmit power level exceeds its capability, the mobile unit can then select a lower code rate. The base station receiver sensitivity improves as the code rate decreases, so the result is similar to increasing the transmitter power.

In the preferred embodiment, the invention uses 3 different code rates. Each is based on a constraint length 7 convolutional code that is standard in the industry. In most cases, the code rate used is rate 2/3, but when a mobile unit determines that it needs more transmit power than it is capable of providing, the code rate is changed to 1/2, and in severe cases the code rate is changed to 1/3. Each of these codes is easily decoded at the base station using a single-chip decoder (e.g., the QUALCOMM Q1650 integrated circuit). The exact choice of the number of code rates, the precise FEC codes used, and the rates selected are not a limitation of the present invention. For example, the FEC code may be selected from, or be a combination of, Reed Solomon codes, BCH codes, Hamming codes, and other FEC codes.

In general, total system capability is a key performance issue, and thus it is desirable to maintain as high a code rate as possible in most situations. In the preferred embodiment, data is structured into blocks (preferably about 400 bits each). Accordingly, there are times when extra bits are available in a block because the data to be sent is inadequate to fill the block. Thus, it may be possible to use a lower code rate and still fit all the data within the same number of blocks that would have been required for a higher code rate.

Therefore, a lower code rate can be selected and the same power level used as would have been needed for the higher code rate. This results in performance in excess of what is required, or, alternatively, transmit power can be reduced to provide the same performance as would be achieved with the higher code rate, resulting in less battery drain for the mobile unit and decreasing the amount of RF interference that transmission causes in other cells in the cellular system.

Because convolutional codes work best when errors are uncorrelated, a means to de-correlate errors that result from fading is useful (this may not be needed with other types of codes). In the preferred embodiment, an interleaver is used to de-correlate the data to be transmitted in known fashion. In the preferred embodiment, the interleaver used is a 20×20 row-column interleaver (although other dimensions and other interleaving methods can be used).

In the preferred embodiment, reverse link messages are transmitted in a fashion similar to the CDPD standard: a message begins with a dotting sequence followed by a synchronization word and other header bits, and then a series of one to many blocks interspersed with control bits. The power level and code rate are preferably selected at the beginning of message transmission and are not changed during transmission. Each block is encoded independently using common code "tailing" or bit flushing techniques for applying convolutional codes to data having a block structure.

In the preferred embodiment, a base station can determine the code rate of incoming messages by either of two methods. In the first method, uncoded bits are provided in the header of each message block that indicate the code rate. However, these bits are vulnerable to errors due to fading, and the base station may fail to extract the proper code rate from these bits. Therefore, a second method is provided that utilizes the fact that each block contains a cyclic redundancy check (CKC) code that allows a base station to determine whether there are any errors remaining in the decoded data. The base station can thus try to decode the data with each possible code rate and choose whichever code rate produces a result that is indicated as being error-free by the CRC. If no code rate yields a block that appears to be error free, the message is discarded.

It is not necessary to have a CRC to determine the code rate; other methods of determining which code rate provides the best output can be used. Some examples of such schemes are (1) to observe the decoded metric growth rate in each code rate; or (2) to re-encode the data coming out of a base station decoder using a selected rate, comparing the decoded data to the demodulated data, and choosing the rate that results in the best agreement. Another possibility is to make use of the CDPD standard "color code" field. Under the CDPD standard, the first 8 bits of a block are fixed, and thus known in advance. Accordingly, if one code rate decoding of a received block generates bits that match the known pattern, that code rate can be chosen.

Details of Preferred Embodiment

FIG. 1 is a block diagram showing a typical prior art cellular radio communication system. A base station 1 is coupled by radio transmissions through an antenna to a mobile unit 2. The mobile unit 2 comprises a user interface 10, a protocol stack 11, a media access control (MAC) processor 12, a modulate and transmit circuit 13, a duplexor switch 14, an antenna 15, a receive and demodulate circuit 16, and a power estimate circuit 17, coupled as shown in known fashion.

The inventive system may be implemented in hardware or software, or a combination of both. In particular, the calculation of mobile unit transmit power, the selection of code rates by the mobile unit, and base station determination of the code rate of messages received from mobile units may be implemented in computer programs executing on programmable computer processors in the base stations and mobile units of a cellular radio communication system. Each computer program is preferably stored on a storage media or device (e.g., ROM or magnetic diskette) readable by a general or special purpose computer processor, for configuring and operating the computer processor when the storage media or device is read by the computer processor to perform the procedures described herein. The inventive system may also be considered to be implemented as a computer-readable storage medium, configured with a computer program, where the storage medium so configured causes a computer processor to operate in a specific and predefined manner to perform the protocol described herein.

Figure 2A:
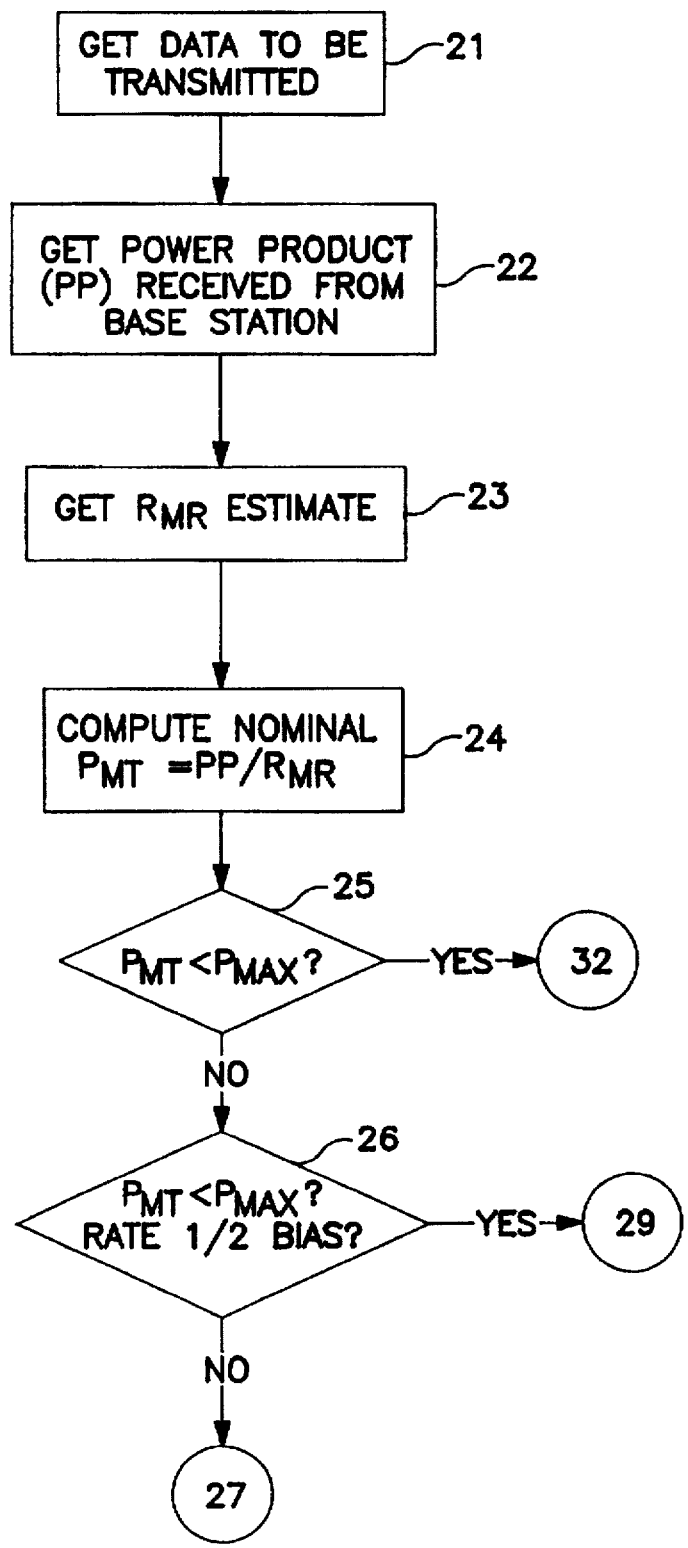
FIGS. 2a and 2b are flow charts showing the preferred method for selecting a code rate for a mobile unit in accordance with the present invention.
Figure 2B:
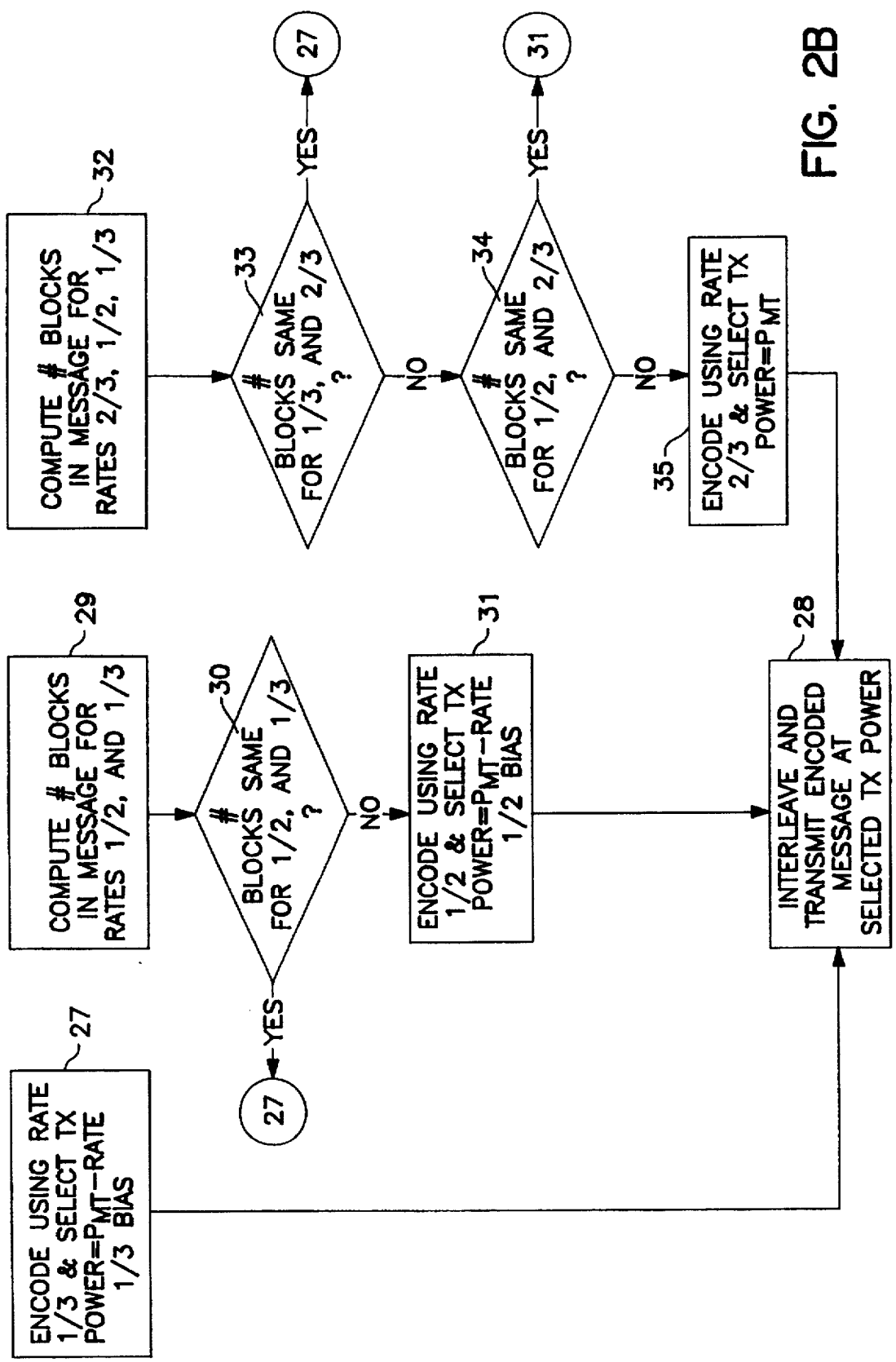

FIGS. 2a and 2b are flow charts showing the preferred method for selecting a code rate for a mobile unit in accordance with the present invention. Initially, the mobile unit processing system fetches the data to be transmitted, in known fashion (Step 21). In the preferred embodiment, data is formatted in the form of 400-bit blocks. Entire blocks are transmitted, even if not all of the block capacity is required for a particular message.

The power product PP is periodically transmitted by each base station 1 in a cellular system, and received by all mobile units 2 within range. The power product PP is based on the premise that all mobile units 2 will normally transmit using a code rate of 2/3. The power product PP received from the base station 1 is fetched from the appropriate register or location in the mobile unit 2 (Step 22). An estimate of the power of the received signal, $P_{MR}$, from the base station 1 is obtained in known fashion from the power estimate circuit 17 (under the CDPD standard, $P_{MR}$ is the standard Received Signal Strength Indicator (RSSI) signal) (Step 23). The mobile unit 2 can then compute a nominal transmit power $P_{MT}$ as the quotient of the power product PP divided by the estimated received power $P_{MR}$ (Step 24). In the preferred embodiment, this calculation is done for each transmission. However, the calculation could be done for each message block.

The nominal transmit power $P_{MT}$ is compared to the maximum transmit power $P_{MAX}$ of the mobile unit 2 (Step 25). If the required nominal transmit power $P_{MT}$ is less than the maximum transmit power $P_{MAX}$, then the mobile unit 2 computes the number of blocks required to encode the message with each of code rates 2/3, 1/2, and 1/3 (Step 32). This is done to take advantage of the fact that a user's data may not fill a complete message block, and thus some "slack" may exist in the message block. Accordingly, one rule that could be applied is that if the number of blocks is the same for two code rates, the lower code rate is selected to provide higher reliability at the same transmit power without increasing the total number of bits transmitted (since entire blocks are always transmitted). Alternatively, the availability of "slack" would allow the use of a lower transmit power at a low code rate to conserve battery life for the mobile unit, while keeping the same error rate performance as the use of a higher transmit power at a higher code rate. In general, transmit power, code rate, and error rate can be traded off against each other as desired. In the preferred embodiment, power conservation and low code rate are optimized to give acceptable error rates. Accordingly, the number of blocks for code rate 2/3 and code rate 1/3 are compared (Step 33). If equal, the message is encoded using code rate 1/3, and a transmit power is selected that approximates the computed nominal transmit power $P_{MT}$ minus a bias factor (explained below) for code rate 1/3 (Step 27). The encoded message is then preferably interleaved and then transmitted (Step 28).

If the comparison in Step 33 is not equal, the number of blocks for code rate 2/3 and code rate 1/2 are compared (Step 34). If equal, the message is encoded using code rate 1/2, and a transmit power is selected that approximates the computed nominal transmit power $P_{MT}$ minus a bias factor for code rate 1/2 (Step 31). The encoded message is then preferably interleaved and then transmitted (Step 28).

If the comparison in Step 34 is not equal, the message is encoded using code rate 2/3, and a transmit power is selected that approximates the computed nominal transmit power $P_{MT}$ (Step 35).

If the nominal transmit power $P_{MT}$ was not less than the maximum transmit power $P_{MAX}$ (Step 25), the nominal transmit power $P_{MT}$ is compared to the maximum transmit power $P_{MAX}$ of the mobile unit 2 plus a bias factor for rate 1/2 (Step 26). If the required nominal transmit power $P_{MT}$ is less than such sum, then the mobile unit 2 computes the number of blocks required to encode the message with each of code rates 1/2 and 1/3 (Step 29). The number of blocks for code rate 1/2 and code rate 1/3 are compared (Step 30). If equal, the message is encoded using code rate 1/3, and a transmit power is selected that approximates the computed nominal transmit power $P_{MT}$ minus a bias factor for code rate 1/3 (Step 27). The encoded message is then preferably interleaved and then transmitted (Step 28).

If the number of blocks for code rate 1/2 and code rate 1/3 are not equal (Step 30), the message is encoded using code rate 1/2, and a transmit power is selected that approximates the computed nominal transmit power $P_{MT}$ minus a bias factor for code rate 1/2 (Step 31). The encoded message is then preferably interleaved and then transmitted (Step 28).

If the required nominal transmit power $P_{MT}$ is not less than the maximum transmit power $P_{MAX}$ plus a bias factor for rate 1/2 (Step 26), then the message is encoded using code rate 1/3, and a transmit power is selected that approximates the computed nominal transmit power $P_{MT}$ minus a bias factor for code rate 1/3 (Step 27). The encoded message is then transmitted (Step 28).

Each bias factor represents the expected increase in signal-to-noise ratio for a particular encoding (meaning that the receive power $P_{BR}$ at the base station can be lower and yet achieve the same error rate performance as a higher code rate). In the preferred embodiment, the bias for rate 1/2 is about 1.5 dB, and the bias for rate 1/3 is about 3 dB. Thus, including such bias factors improves overall performance of the inventive system. However, such bias factors are not necessary to practice the basic concepts of the invention.

Figure 3A:
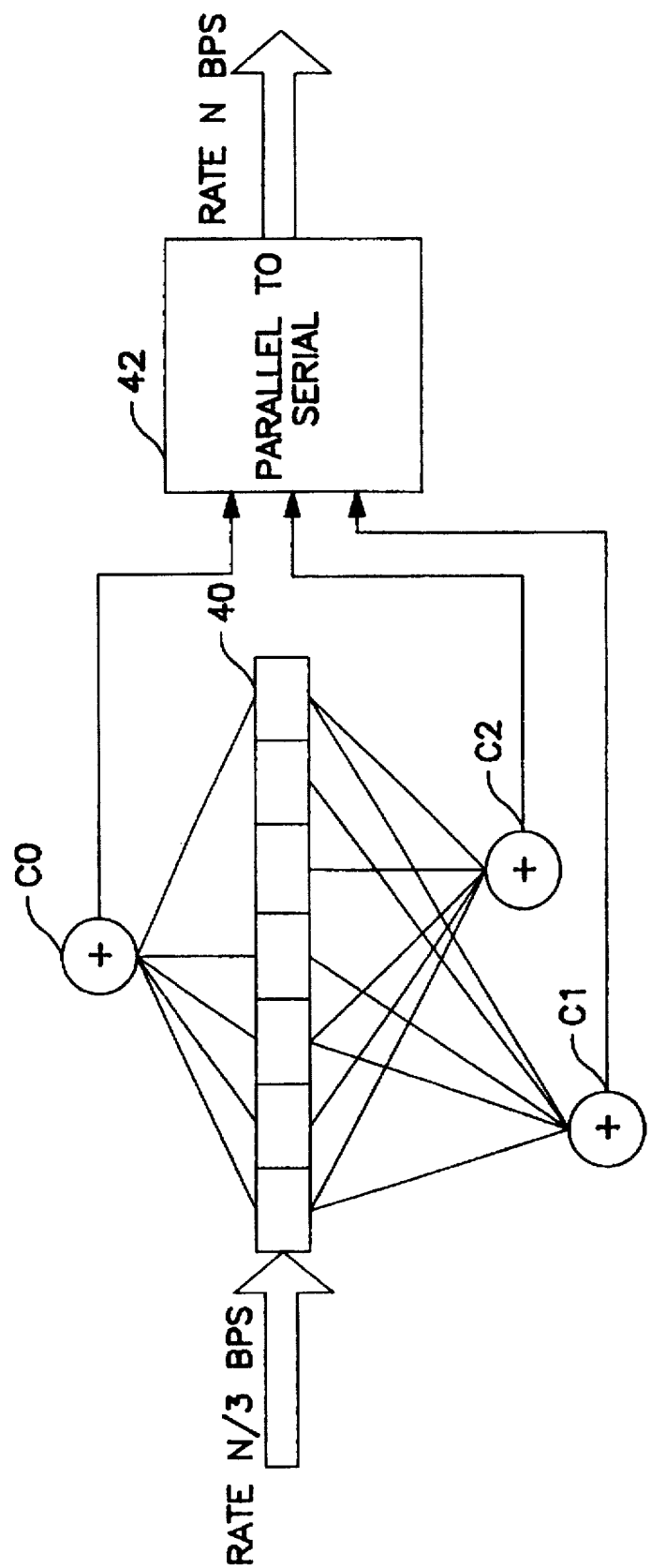
FIG. 3a is a block diagram of a first embodiment of a forward error correction code encoder that may be used with the present invention.

FIG. 3a is a block diagram of a first embodiment of a forward error correction code encoder that may be used with the present invention. Input data at a rate of N/3 bits per second is input into a 7-bit register 40. The contents of the register 40 are coupled to three exclusive OR circuits C0, C1, and C2, as shown. For FIG. 3a, the FEC combinatorial polynomials are as follows:

$$C0 = X^1 + X^2 + X^3 + X^4 + X^7$$

$$C1 = X^1 + X^3 + X^4 + X^6 + X^7$$

$$C2 = X^1 + X^2 + X^3 + X^5 + X^7$$

The output of the exclusive OR circuits C0, C1, and C2 are coupled to a parallel to serial converter 42, in known fashion. The output of the parallel to serial circuit is a data stream having a rate of N.

Figure 3B:
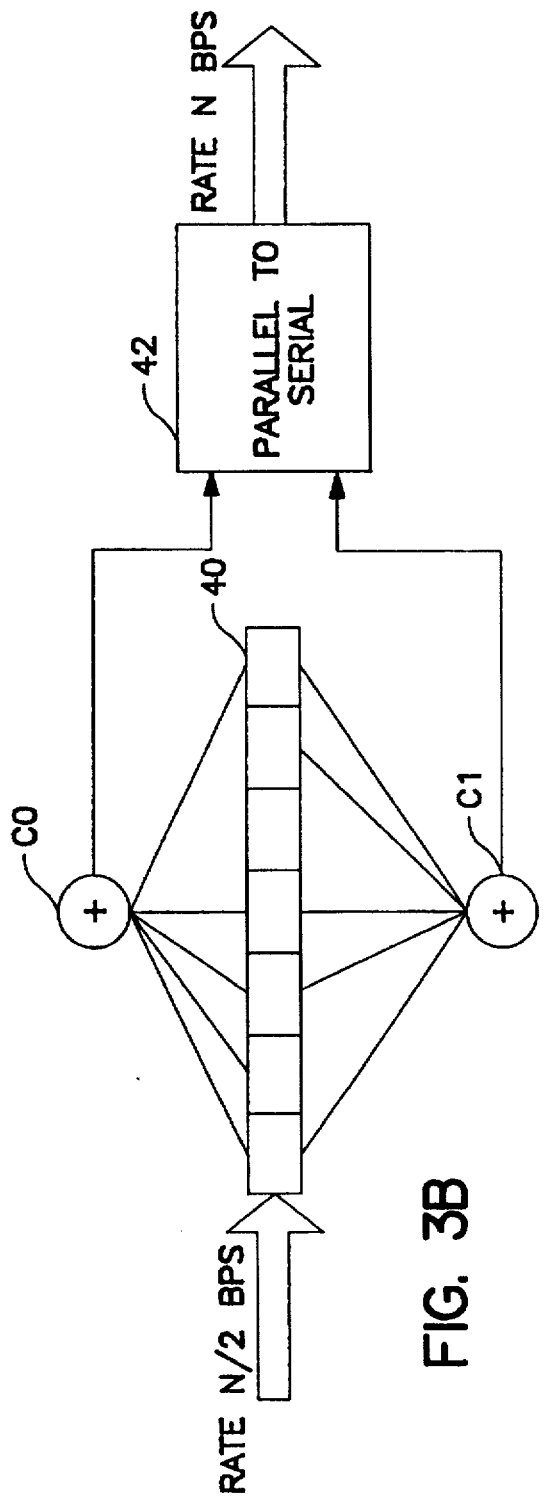
FIG. 3b is a block diagram of a second embodiment of a forward error correction code encoder that may be used with the present invention.

FIG. 3b is a block diagram of a second embodiment of a forward error correction code encoder that may be used with the present invention. Input data at a rate of N/2 bits per second is input into a 7-bit register 40. The contents of the register 40 are coupled to two exclusive OR circuits C0 and C1, as shown. For FIG. 3b, the FEC combinatorial polynomials are as follows:

$$C0 = X^1 + X^2 + X^3 + X^4 + X^7$$

$$C1 = X^1 + X^3 + X^4 + X^6 + X^7$$

The output of the exclusive OR circuits C0 and C1 are coupled to a parallel to serial converter 42, in known fashion. The output of the parallel to serial circuit is a data stream having a rate of N.

Figure 3C:
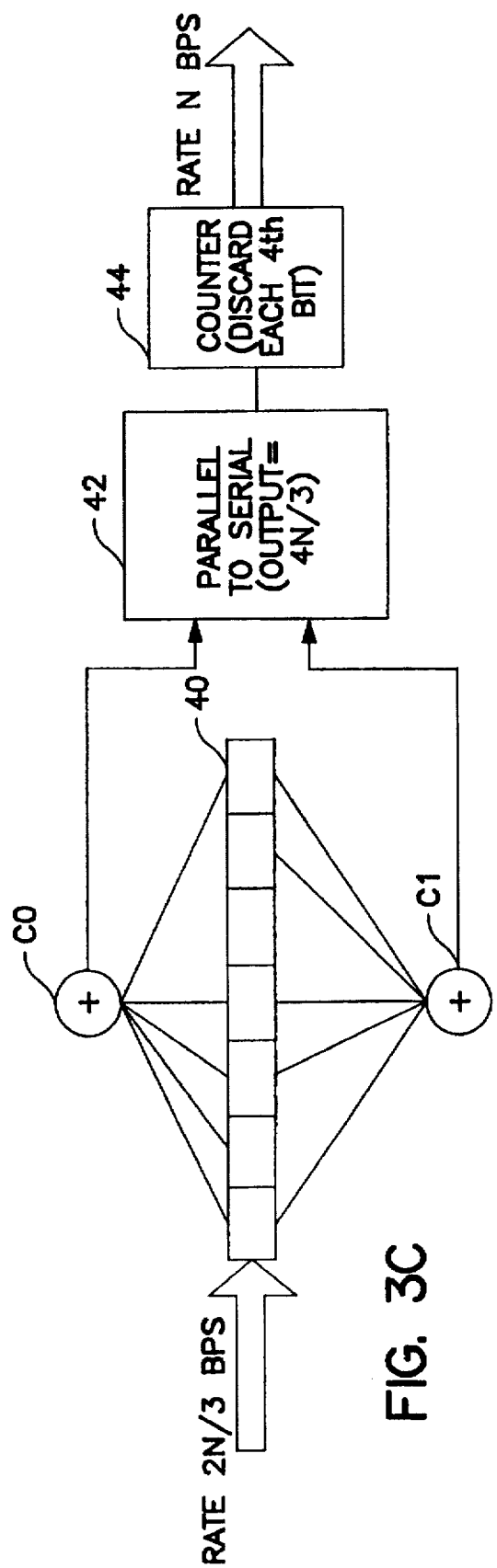
FIG. 3c is a block diagram of a third embodiment of a forward error correction code encoder that may be used with the present invention.

FIG. 3c is a block diagram of a third embodiment of a forward error correction code encoder that may be used with the present invention. Input data at a rate of 2N/3 bits per second is input into a 7-bit register 40. The contents of the register 40 are coupled to two exclusive OR circuits C0 and C1, as shown. For FIG. 3c, the FEC combinatorial polynomials are the same as for FIG. 3b. The output of the exclusive OR circuits C0 and C1 are coupled to a parallel to serial converter 42, in known fashion. The output of the parallel to serial converter 42 is 4N/3 bits per second. However, the output of the parallel to serial converter 42 is coupled to a simple counter circuit 44 which gates out only 3 of every 4 bits (i.e., it discards every 4th bit), to achieve an output data stream having a rate of N. In the preferred embodiment, the count pattern discards every other bit of C0 (gating or "puncture" pattern of binary 10), and keeps every bit of C1 (gating or "puncture" pattern of binary 11).

The invention may also be used on the forward link of a cellular digital data radio communication system. That is, one can achieve a gain in system performance by varying the code rate in the forward (outbound) signal from the base station to mobile units. In cases where the link is one-to-one (i.e., one mobile unit per base channel), this advantage is more obvious, but the invention may also provide benefits in one-to-many link systems. If the signal level received at a base station is less than the desired level for the code rate being used, the base station can determine approximately what receive power level the mobile unit sees. To determine this, the base station may assume that the mobile is transmitting at its maximum power and that the base station knows what that maximum power is. The procedure is then straightforward. If the power transmitted by the mobile is $P_{MT}$ and the received power at the base station is $P_{BR}$ (taking into account the difference in antenna gains for receive versus transmit), then the path loss is calculated as $P_{MT}/P_{BR}$. The power level that the mobile unit is receiving on the forward channel, $P_{MR}$, is then $P_{BT} * P_{BR}/P_{MT}$. The system should be setup such that there is a desired, minimum value of $P_{MR}$ for each available code rate. When the base station determines that the power at the mobile unit is too low for the chosen forward channel code rate, then the base station can choose a lower code rate to lower the block error rate at the mobile unit's receiver.

Alternatively, in situations where the link is balanced (i.e., the receiver performance is approximately the same for both the mobile unit and the base station), then the base station can change code rate when it sees that the mobile unit has changed its code rate. The mobile unit will then know approximately when its received signal will change rates, thus reducing the complexity of the mobile unit.

Alternatively, the mobile unit can inform the base station, by means of a transmitted message, that the mobile unit's receive level is too low for the current coding rate and request a new code rate. If the mobile unit does not notice that the code rate has changed, the mobile unit can assume that its message was not received by the base station and that it must retransmit the message until the code rate gets changed. The decision of when to request a code rate change can be based upon short term block error rate, received power level, short term bit error rate, or other characteristic.

Alternatively, and again under the assumption that the links are somewhat balanced, the base station can use the reverse channel block error rate as an indication that the code rate being used in the reverse direction is insufficient and thus the code rate selection for the forward channel should be reduced to be lower than the most recently known code rate used on the reverse link.

SUMMARY

To summarize, key benefits of this invention are that it (1) allows the most disadvantaged mobile units in a mobile wireless data communication system to achieve acceptable reverse link error performance through the use of very low code rates (2) without introducing the capacity degradation that results from low code rates into all transmissions of non-disadvantaged mobile units, which comprise the majority of transmissions within a cellular radio communication system. Some of the unique features of this invention are:

(1) variable rate coding employed in the reverse link of a mobile wireless data communications system;

(2) mobile unit code rate selection integrated with mobile power control to provide a minimum acceptable performance level at the base station;

(3) mobile unit code rate selection based on the quantity of data to be transmitted;

(4) base station determination of code rate by attempting to decode all code rates and choosing the best result.

A number of embodiments of the present invention have been described. Nevertheless, it will be understood that various modifications may be made without departing from the spirit and scope of the invention. For example, the method or algorithm for selecting code rates may instead be (1) based on the receive (forward) channel block error rate; (2) based on the transmit (reverse) channel block error rate; (3) based on the rate of retransmissions in a link; and (4) calculated by a base station from known characteristics of a mobile unit and measurements of the channel between the base station and such mobile unit, and then transmitted to such mobile unit. As a further example, only two code rates may be used, or more than three code rates may be used. Moreover, as would be recognized in the art, the order in which the steps shown in FIGS. 2a and 2b can be changed in many cases without affecting the result of the procedure. Still further, the invention may be used on the forward link as well as the reverse link of a communication system. Accordingly, it is to be understood that the invention is not to be limited by the specific illustrated embodiment, but only by the scope of the appended claims.

What is claimed is:

1. A method of improving transmission performance in a cellular digital data radio communication system, comprising the steps of:

(a) transmitting error-correction encoded data from a mobile unit to a base station using a first code rate;

(b) at the base station, determining the first code rate for error-correction encoded data received from the mobile unit by analyzing a characteristic of the encoded data;

(c) determining if the transmitted error-correction encoded data using the first code rate will be satisfactorily received by the base station, and if not, selecting a second code rate, less than the first code rate, for the mobile unit; and (d) transmitting error-correction encoded data from the mobile unit to the base station using the second code rate.

2. The method of claim 1, including the further steps of:

(a) determining if the transmitted error-correction encoded data using the second code rate will be satisfactorily received by the base station, and if not, selecting a third code rate, less than the second code rate, for the mobile unit; and (b) transmitting error-correction encoded data from the mobile unit to the base station using the third code rate.

3. The method of claim 1, including the further step of:

(a) interleaving the error-correction encoded data before transmission from the mobile unit.

4. A method of improving transmission performance in a cellular digital data radio communication system, comprising the steps of:

(a) determining a desired transmit power level for a mobile unit for transmitting data from the mobile unit to a base station;

(b) determining if the desired transmit power level is less than a maximum transmit power level of the mobile unit;

(1) and if so, selecting a first code rate for error-correction encoding such data, and a first transmit power level less than or equal to the maximum transmit power level of the mobile unit, and transmitting error-correction encoded data from the mobile unit to the base station using the first code rate and the first transmit power level;

(2) and if not, selecting a second code rate, less than the first code rate, for error-correction encoding such data, and a second transmit power level less than or equal to the maximum transmit power level of the mobile unit minus a bias factor related to the second code rate, and transmitting error-correction encoded data from the mobile unit to the base station using the second code rate and the second transmit power level.

5. The method of claim 4, wherein data is transmitted in blocks, including the further step of:

(a) if the desired transmit power level is less than a maximum transmit power level of the mobile unit, selecting the second code rate if the number of blocks required to transmit such data is the same for the second code rate as for the first code rate.

6. The method of claim 4, including the further step of:

(a) at the base station, determining the code rate for error-correction encoded data received from a mobile unit by attempting to decode such data using all possible code rates available to the mobile unit, and choosing the code rate that best decodes such data.

7. The method of claim 4, including the further step of:

(a) interleaving the error-correction encoded data before transmission from the mobile unit.

8. A method of improving transmission performance in a cellular digital data radio communication system, comprising the steps of:

(a) determining a desired transmit power level for a mobile unit for transmitting data from the mobile unit to a base station;

(b) determining if the desired transmit power level is less than a maximum transmit power level of the mobile unit, and if so, selecting a first code rate for error-correction encoding such data, and a first transmit power level less than or equal to the maximum transmit power level of the mobile unit, and transmitting error-correction encoded data from the mobile unit to the base station using the first code rate and the first transmit power level;

(c) and if not, then determining if the desired transmit power level is less than a maximum transmit power level of the mobile unit plus a first bias factor related to a second code rate, and if so, selecting the second code rate, less than the first code rate; for error-correction encoding such data, and a second transmit power level less than or equal to the maximum transmit power level of the mobile unit minus the first bias factor, and transmitting error-correction encoded data from the mobile unit to the base station using the second code rate and the second transmit power level;

(d) and if not, selecting a third code rate, less than the second code rate, for error-correction encoding such data, and a third transmit power level less than or equal to the maximum transmit power level of the mobile unit minus a second bias factor related to the third code rate, and transmitting error-correction encoded data from the mobile unit to the base station using the third code rate and the third transmit power level.

9. The method of claim 8, wherein data is transmitted in blocks, including the further steps of:

(a) if the desired transmit power level is less than a maximum transmit power level of the mobile unit, then:

(1) selecting the third code rate if the number of blocks required to transit such data is the same for the third code rate as for the first code rate; otherwise (2) selecting the second code rate if the number of blocks required to transmit such data is the same for the second code rate as for the first code rate.

10. The method of claim 8, wherein data is transmitted in blocks, including the further steps of:

(a) if the desired transmit power level is less than a maximum transmit power level of the mobile unit plus the first bias factor, then:

(1) selecting the third code rate if the number of blocks required to transmit such data is the same for the third code rate as for the second code rate.

11. The method of claim 8, including the further step of:

(a) at the base station, determining the code rate for error-correction encoded data received from a mobile unit by attempting to decode such data using all possible code rates available to the mobile unit, and choosing the code rate that best decodes such data.

12. The method of claim 8 including the further step of:

(a) interleaving the error-correction encoded data before transmission from the mobile unit.

13. A system for improving transmission performance in a cellular digital data radio communication system, comprising:

(a) a wireless transmission system for transmitting error-correction encoded data from a mobile unit to a base station;

(b) a selector, coupled to the wireless transmission system, for:
   (1) selecting a first code rate for the mobile unit for error-correction encoding of such data; and
   (2) selecting a second code rate, less than the first code rate, for the mobile unit for error-correction encoding of such data if the transmitted error-correction encoded data using the first code rate will not be satisfactorily received by the base station; and (c) a comparator, coupled to the selector, for determining if the number of blocks required to transmit such data is the same for the second code rate as for the first code rate, and if so, then causing the selector to select the second code rate in preference to the first code rate.

14. The system of claim 13, further including an interleaver for interleaving the error-correction encoded data before transmission from the mobile unit.

15. A computer program for improving transmission performance in a cellular digital data radio communication system, each computer program being stored on a media readable by a computer processor, for configuring the computer processor upon being read and executed by the computer processor to cause the computer processor to:

(a) transmit error-correction encoded data from a mobile unit to a base station using a first code rate;

(b) determine the first code rate for error-correction encoded data received from the mobile unit by analyzing a characteristic of the encoded data;

(c) determine if the transmitted error-correction encoded data using the first code rate will be satisfactorily received by the base station, and if not, selecting a second code rate, less than the first code rate, for the mobile unit; and (d) transmit error-correction encoded data from the mobile unit to the base station using the second code rate.

16. A computer-readable storage medium, configured with a computer program, where the storage medium so configured causes a computer processor to operate in a specific and predefined manner to cause the computer processor to:

(a) transmit error-correction encoded data from a mobile unit to a base station using a first code rate;

(b) determine the first code rate for error-correction encoded data received from the mobile unit by analyzing a characteristic of the encoded data;

(c) determine if the transmitted error-correction encoded data using the first code rate will be satisfactorily received by the base station, and if not, selecting a second code rate, less than the first code rate, for the mobile unit; and (d) transmit error-correction encoded data from the mobile unit to the base station using the second code rate.

* * * * *